(12) United States Patent
Ozawa

(10) Patent No.: US 9,434,851 B2
(45) Date of Patent: Sep. 6, 2016

(54) INK SET FOR INKJET RECORDING AND INKJET RECORDING METHOD

(71) Applicant: KYOCERA Document Solutions Inc., Osaka (JP)

(72) Inventor: Noriaki Ozawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/622,052

(22) Filed: Feb. 13, 2015

(65) Prior Publication Data
US 2015/0232679 A1 Aug. 20, 2015

(30) Foreign Application Priority Data
Feb. 20, 2014 (JP) ................................. 2014-030789

(51) Int. Cl.
| | | |
|---|---|---|
| C09D 11/40 | (2014.01) | |
| C09D 11/326 | (2014.01) | |
| C09D 11/328 | (2014.01) | |
| C09D 11/324 | (2014.01) | |
| C09D 179/02 | (2006.01) | |
| C08K 5/42 | (2006.01) | |
| C08K 3/04 | (2006.01) | |
| C09D 11/10 | (2014.01) | |

(52) U.S. Cl.
CPC ............... *C09D 11/328* (2013.01); *C08K 3/04* (2013.01); *C08K 5/42* (2013.01); *C09D 11/10* (2013.01); *C09D 11/324* (2013.01); *C09D 11/326* (2013.01); *C09D 11/40* (2013.01); *C09D 179/02* (2013.01)

(58) Field of Classification Search
CPC C09D 11/328; C09D 11/324; C09D 179/02; C08K 5/42; C08K 3/04; B41J 2002/2058; B41J 2/25; B41J 2/211; B41J 2/265; B41J 2/515; B41J 2/16585; B41J 2/16588; B41J 2002/16591

See application file for complete search history.

(56) References Cited

U.S. PATENT DOCUMENTS

| | | | |
|---|---|---|---|
| 5,948,512 A | 9/1999 | Kubota et al. | |
| 6,232,370 B1 | 5/2001 | Kubota et al. | |
| 6,485,138 B1 | 11/2002 | Kubota et al. | |
| 2002/0041317 A1* | 4/2002 | Kashiwazaki | C09D 11/324 347/100 |
| 2002/0044187 A1* | 4/2002 | Koitabashi | B41J 2/2114 347/101 |
| 2003/0195275 A1* | 10/2003 | Sanada | C09D 11/324 523/160 |
| 2004/0070654 A1* | 4/2004 | Taguchi | C09D 11/328 347/100 |
| 2005/0176847 A1* | 8/2005 | Cagle | C09D 11/30 523/160 |
| 2006/0203061 A1* | 9/2006 | Ichinose | B41J 2/2056 347/100 |

(Continued)

FOREIGN PATENT DOCUMENTS

JP     H09-286940 A     11/1997

*Primary Examiner* — Matthew Luu
*Assistant Examiner* — Patrick King
(74) *Attorney, Agent, or Firm* — Studebaker & Brackett PC

(57) ABSTRACT

An ink set for inkjet recording includes: a first ink containing a black dye and a polyamine; and a second ink containing a black pigment having a coat of an anionic resin. An inkjet recording method includes: ejecting a first ink containing a black dye and a polyamine onto a recording medium through an inkjet recording head; and ejecting a second ink containing a black pigment having a coat of an anionic resin onto the first ink ejected on the recording medium through an inkjet recording head.

15 Claims, 2 Drawing Sheets

(56) References Cited

U.S. PATENT DOCUMENTS

| | | | | |
|---|---|---|---|---|
| 2007/0238828 A1* | 10/2007 | Matsuki | ............... | C08F 297/08 524/584 |
| 2008/0022887 A1* | 1/2008 | Tanoue | ............... | C09D 11/324 106/31.2 |
| 2009/0192248 A1* | 7/2009 | Palumbo | ............... | C09B 67/001 524/186 |
| 2012/0076994 A1* | 3/2012 | Herlihy | ............... | C09D 11/101 428/195.1 |
| 2013/0183500 A1* | 7/2013 | Kasperchik | ............ | B41J 2/2103 428/207 |
| 2013/0316231 A1* | 11/2013 | Iijima | ..................... | C09D 5/14 429/211 |
| 2014/0009533 A1* | 1/2014 | Furuta | ....................... | B41J 2/15 347/33 |

* cited by examiner

INK SET FOR INKJET RECORDING AND INKJET RECORDING METHOD

INCORPORATION BY REFERENCE

The present application claims priority under 35 U.S.C. §119 to Japanese Patent Application No. 2014-030789, filed Feb. 20, 2014. The contents of this application are incorporated herein by reference in their entirety.

BACKGROUND

The present disclosure relates to an ink set for inkjet recording and an inkjet recording method.

Recent rapid advances in inkjet recording technologies have enabled printing of high-definition inkjet photographs comparable to silver halide photographs. Increase in printing speed has created more opportunity to use a linehead (long head).

Compared to an inkjet recording apparatus including a serial head, however, an inkjet recording apparatus including a linehead is basically no good at overprinting and therefore incapable of providing a significantly improved image density.

Ink properties are therefore important for formation of a high-quality image with the use of the long linehead. In a known recording method, for example, a polyamine is used as a pre-treatment solution, and then an ink containing a pigment is used.

SUMMARY

An ink set for inkjet recording according to the present disclosure includes: a first ink containing a black dye and a polyamine; and a second ink containing a black pigment having a coat of an anionic resin.

An inkjet recording method according to the present disclosure includes: ejecting a first ink containing a black dye and a polyamine onto a recording medium through an inkjet recording head; and ejecting a second ink containing a black pigment having a coat of an anionic resin onto the first ink ejected on the recording medium through an inkjet recording head.

DETAILED DESCRIPTION

Figure 1:
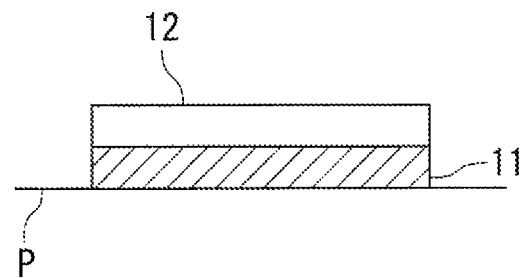
FIG. 1 is a diagram illustrating an inkjet recording method according to an embodiment of the present disclosure.

Hereinafter, an ink set (more specifically, an ink set for inkjet recording) and a recording method with the use of the ink set according to an embodiment of the present disclosure will be described.

The ink set of the present embodiment includes a first ink and a second ink. The first and second inks are water-based inks. Each ink preferably has a water content of no less than 20% by mass and no greater than 70% by mass, and more preferably no less than 25% by mass and no greater than 60% by mass relative to the total mass of the ink.

[First Ink]

Hereinafter, the first ink included in the ink set of the present embodiment will be described. The first ink contains water, a dye, and a polyamine. The first ink may further contain a penetrating agent. A solution stabilizer may be added to the first ink in order that the components of the first ink are in a stable dissolved state. A moisturizing agent that inhibits evaporation of the liquid components of the first ink may be added to the first ink in order that the first ink has stable viscosity.

(Polyamine)

Hereinafter, the polyamine contained in the first ink will be described. The polyamine (e.g., trimethylamine, diallylamine, or dimethylallylamine) is cationic as having an $NH_2$ group. The polyamine caps an acid-base moiety of the dye thereby to improve the water resistance of the dye on a recording medium (e.g., paper P, see FIG. 1). Furthermore, the polyamine aggregates with an anionic resin coating a pigment contained in the later-described second ink. As a result, the pigment (hereinafter, may be referred to as pigment particles) is precipitated, increasing the copy density of an image formed on paper P. The polyamine reacts with the anionic resin more slowly than a metal ion does. The polyamine can improve the fixability of the ink since it aggregates with the anionic resin more slowly than a metal ion does.

Preferably, the polyamine has a mass average molecular weight (Mw) of no less than 5000 and no greater than 15000. As long as the polyamine has a mass average molecular weight (Mw) of no less than 5000, the ink is prevented from having too high permeability to the paper P. Accordingly, the dye exhibits improved water resistance on the paper P, and an image having a desired density can be obtained. As long as the polyamine has a mass average molecular weight (Mw) of no greater than 15000, sufficient permeability of the ink to the paper P is ensured, and occurrence of ink offset is reduced.

Preferably, the amount of the polyamine contained in the first ink is no less than 0.05% by mass and no greater than 0.5% by mass relative to the total mass of the first ink. As long as the polyamine content in the first ink is no less than 0.05% by mass, the polyamine contained in the first ink slowly aggregates with the anionic resin coating the pigment contained in the second ink when the first ink is mixed with the later-described second ink. As a result, a sufficient amount of pigment is precipitated. Therefore, an image having a desired density can be obtained. As long as the polyamine content in the first ink is no greater than 0.5% by mass, the dye exhibits sufficiently low water resistance on the paper P. As a result, sufficient permeability of the ink is ensured, and therefore occurrence of ink offset is expected to be reduced.

(Dye)

The first ink of the present embodiment contains a dye as a colorant. The dye is water-soluble. A black direct dye is preferable as the dye. The direct dye is less likely to react with the polyamine in a liquid. The use of the direct dye therefore reduces the possibility of aggregation of the dye in the first ink. As a result, the direct dye and the polyamine are easily mixed homogeneously in the first ink. A dye other than the direct dye may be used as the dye in the first ink. For example, an acid dye may be used instead of the direct dye depending on the intended use. However, the direct dye tends to exhibit higher water resistance on the paper P than the acid dye.

[Second Ink]

Hereinafter, the second ink included in the ink set of the present embodiment will be described. The second ink contains a black pigment having a coat of an anionic resin. The second ink is obtained by diluting a dispersion of the pigment with water. The second ink may further contain a dispersant and a penetrating agent. The second ink contains the pigment dispersion as a colorant. The pigment dispersion includes the pigment particles and a resin coating the pigment particles. The resin is located on surfaces of the pigment particles (adsorbed to the pigment particles) to restrict aggregation of the pigment particles. Some of the resin in the second ink is not adsorbed to the pigment particles (remains as unadsorbed resin). The resin is anionic.

(Pigment)

A black pigment is used as the pigment. Preferable examples of the black pigment include carbon black. The carbon black has an excellent effect of coloring in black and thus enables formation of a high-quality image. The pigment particles are not water-soluble. Therefore, the pigment particles are coated with a resin to be made water-soluble.

The dye content in the first ink is preferably no less than 4% by mass and no greater than 8% by mass relative to the total mass of the first ink. The pigment content in the second ink is preferably no less than 4% by mass and no greater than 8% by mass relative to the total mass of the second ink. As long as the dye content in the first ink is no less than 4% by mass relative to the total mass of the first ink, and the pigment content in the second ink is no less than 4% by mass relative to the total mass of the second ink, formation of an image having a desired density is facilitated. As long as the dye content in the first ink is no greater than 8% by mass relative to the total mass of the first ink, and the pigment content in the second ink is no greater than 8% by mass relative to the total amount of the second ink, the fluidity of each ink is ensured to facilitate formation of an image having a desired density, and sufficient permeability of each ink into a paper P is ensured to reduce occurrence of ink offset.

The colorants (dye and pigment) preferably have a volume median diameter ($D_{50}$) of no less than 30 nm and no greater than 200 nm, more preferably no less than 70 nm and no greater than 130 nm in order to improve the color density, the hue, or the stability of the inks.

(Resin)

An anionic resin is used as the resin for coating the pigment particles. As the anionic resin, a styrene-acrylic-based resin including a unit derived from styrene and a unit derived from acrylic acid, methacrylic acid, an acrylic acid ester, or a methacrylic acid ester is preferable. Specific examples of preferable resins include styrene-acrylic acid-alkyl acrylate copolymers, styrene-methacrylic acid-alkyl methacrylate-alkyl acrylate copolymers, styrene-acrylic acid copolymers, styrene-maleic acid copolymers, styrene-maleic acid-alkyl acrylate copolymers, styrene-methacrylic acid copolymers, styrene-alkyl methacrylate copolymers, styrene-maleic half ester copolymers, vinylnaphthalene-acrylic acid copolymers, and vinylnaphthalene-maleic acid copolymers. The resin containing acrylic acid has a COO— group.

The resin preferably has a mass average molecular weight (Mw) of no less than 20000, and more preferably no less than 20000 and no greater than 50000. The mass average molecular weight (Mw) can be measured by gel filtration chromatography. The molecular weight of the resin can be adjusted by changing conditions for the polymerization of the resin (amount of polymerization initiator, polymerization temperature, polymerization time, and so on). The amount of the radical polymerization initiator is preferably in a range from 0.001 mol to 5 mol, and more preferably in a range from 0.01 mol to 2 mol relative to 1 mol of the monomer mixture. The polymerization temperature is preferably in a range of 60° C.±10° C. The polymerization time is preferably in a range from 10 hours to 24 hours.

The resin preferably has an acid value of no less than 150 mgKOH/g and no greater than 300 mgKOH/g. As long as the resin has an acid value of no less than 150 mgKOH/g, the pigment is expected to be dispersed well and readily micronized. As long as the resin has an acid value of no greater than 300 mgKOH/g, the ink is expected to have improved preservability. Desirably, the pigment particles are coated with a resin having a molecular weight of the order of several tens of thousands in order to increase the printing quality.

The acid value of the resin can be adjusted by changing the amount of a monomer to use for synthesizing the resin. A monomer having an acidic functional group (e.g., carboxyl group) such as acrylic acid or methacrylic acid is used for the synthesis of the resin. The acid value of the resin can be increased by increasing the amount of the monomer having an acidic functional group.

The amount of the resin in the pigment dispersion is preferably no less than 15 parts by mass and no greater than 100 parts by mass relative to 100 parts by mass of the pigment.

Preferably, the proportion of the resin adsorbed to the pigment particles (adsorbed resin) out of the resin in the second ink is no less than 93% by mass and less than 100% by mass. As long as the proportion of the adsorbed resin is no less than 93% by mass, occurrence of ink offset can be reduced.

According to the ink set for inkjet recording of the present embodiment, it is possible to form an image having a high density while reducing occurrence of ink offset.

Next, an inkjet recording method according to the embodiment of the present disclosure will be described with reference mainly to FIG. 1.

Figure 2:
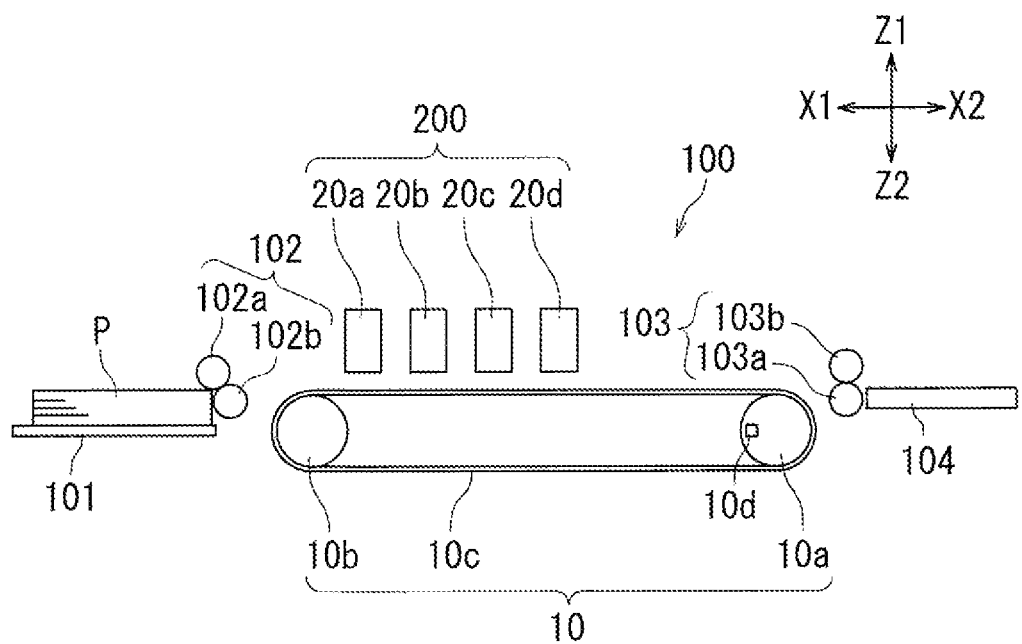
FIG. 2 is a diagram illustrating an evaluation apparatus used in examples of the present disclosure.

As illustrated in FIGS. 1 and 2, a first ink layer 11 of a first ink ejected from a linehead 20a is formed on paper P. Subsequently, a second ink is ejected from a linehead 20d. Thus, a second ink layer 12 is formed on the first ink layer 11.

The paper P contains fibers of a cellulose having a hydroxyl group. Once the first ink layer 11 has been formed on the paper P, therefore, a dye in the first ink layer 11 reacts with the hydroxyl group of the cellulose in the paper P to be adsorbed to the cellulose. Once the second ink layer 12 has been formed, a substituent (e.g., COO+ group) of a resin coating a pigment in the second ink layer 12 reacts with a hydroxyl group of the cellulose in the paper P, and thus the resin coating the pigment is adsorbed to the cellulose. Furthermore, an amino group in a polyamine in the first ink layer 11 aggregates with the substituent (e.g., COO— group) of the resin coating the pigment in the second ink layer 12. Since the dye contained in the first ink reacts with the pigment contained in the second ink on the paper P, the probability of contact between the paper P, and the dye and the pigment increases, and the density of an image to be formed increases. The polyamine contained in the first ink slowly aggregates with the anionic resin coating the pigment contained in the second ink. The pigment is precipitated with the aggregation. With a sufficient amount of precipitated pigment, the density of an image to be formed is sufficiently high. If the polyamine is contained in the second ink, the resin coating the pigment and the polyamine react and aggregate. Consequently, the pigment cannot be mixed homogeneously in the second ink.

In the present embodiment, therefore, the first ink containing the black dye and the polyamine, and the second ink containing the black pigment having a coat of an anionic resin are used. The first ink and the second ink are mixed together on the paper P. As a result, the amino group in the polyamine in the first ink layer 11 reacts with the substituent (e.g., COO— group) of the resin coating the pigment in the second ink layer 12, and thus the pigment is precipitated. The density of an image formed on the paper P is increased, and occurrence of ink offset is reduced because of the precipitation of the pigment. As a result, a high-quality image can be formed. The anionic resin coating the pigment is caused to aggregate more slowly by the polyamine than by a metal salt typified by calcium chloride. Accordingly, the fixability of the inks is easily controlled by changing the mass average molecular weight (Mw) of the resin or the proportion of the adsorbed resin.

Preferably, the dye contained in the first ink is a direct dye, and the pigment contained in the second ink is carbon black. The use of the direct dye as the dye provides the first ink in which the polyamine and the dye are homogeneously dispersed. The use of carbon black as the pigment provides an excellent coloring effect. As a result, a high-quality image can be formed.

Preferably, no less than 93% by mass of the anionic resin is adsorbed to the pigment, and the anionic resin has a mass average molecular weight of no less than 20000. As long as the proportion of the adsorbed resin is no less than 93% by mass, occurrence of ink offset can be reduced. As long as the anionic resin has a mass average molecular weight of no less than 20000, the anionic resin coating the pigment readily aggregates to encourage the precipitation of the pigment, and thus a high-quality image can be formed.

Preferably, the anionic resin is a styrene-acrylic resin, and the resin has an acid value of no less than 150 mgKOH/g and no greater than 300 mgKOH/g. If the resin has an acid value of less than 150 mgKOH/g, the pigment is poorly dispersed. If the resin has an acid value of greater than 300 mgKOH/g, the preservability of the ink is poor. As long as the resin has an acid value of no less than 150 mgKOH/g and no greater than 300 mgKOH/g, therefore, the pigment in the ink is dispersed well to provide an image with a higher color producing power and achieve a higher coloring power, enhancing the preservability of the ink. As a result, a high-quality image can be formed.

The inkjet recording method of the present embodiment includes: ejecting the first ink containing the black dye and the polyamine onto the paper P through an inkjet recording head; and ejecting the second ink containing the black pigment having a coat of the anionic resin onto the first ink ejected on the paper P. Thus, the polyamine is caused to aggregate with the anionic resin coating the black pigment efficiently to precipitate the black pigment. Consequently, the fixability of the ink is improved. As a result, a high-quality image can be formed.

Preferably, the inkjet recording head is a long inkjet recording head. The use of a long inkjet recording head as the inkjet recording head can increase the speed of the inkjet recording.

EXAMPLES

Hereinafter, examples of the present disclosure will be described. However, the present disclosure is not limited to the examples.

[Evaluation 1]

Hereinafter, Evaluation 1 will be described. In Evaluation 1, the image density, the water resistance of the image on the paper P, and the offset resistance of the ink were evaluated for second inks including different pigment dispersions. The later-described ink A4 was used as a first ink.

<Method of preparing inks included in ink sets>

(First Ink)

Table 1 shows the composition of the first ink (ink A4) included in ink sets evaluated in Evaluation 1.

TABLE 1

| Ink components | Proportion (% by mass) |
|---|---|
| Direct Black 19 | 6.00 |
| Triethylene glycol monobutyl ether | 4.50 |
| 2-pyrrolidone | 5.00 |
| Polyamine | 0.25 |
| Olfine E1010 | 0.40 |
| Glycerin | 30.00 |
| Ion exchanged water | Residual amount |
| Total | 100.00 |

Hereinafter, a method of preparing the first ink included in the ink sets evaluated in Evaluation 1 will be described.

First, 6.00% by mass of Direct Black 19, 4.50% by mass of triethylene glycol monobutyl ether, 5.00% by mass of 2-pyrrolidone (solution stabilizer), 0.25% by mass of a polyamine, 0.40% by mass of an ethylene oxide adduct of acetylene diol ("Olfine E1010", product of Nissin Chemical Industry Co., Ltd.) (dispersant), 30.00% by mass of glycerin (moisturizing agent), and a residual amount of ion exchanged water were homogeneously mixed under stirring at a rotation speed of 400 rpm using a stirring machine ("Three-One Motor BL-600", product of AS ONE Corporation) to give a liquid mixture. Subsequently, the liquid mixture was filtered through a filter having a pore size of 5 nm in order to remove foreign substances, coarse particles, and the like. As a result, the first ink (ink A4) was obtained. The polyamine contained in the ink A4 had a mass average molecular weight (Mw) of 7500. The ink A4 used in Evaluation 1 and the ink A4 used in later-described Evaluation 3 are the same.

(Second Inks)

Table 2 shows the composition of the second inks included in the ink sets evaluated in Evaluation 1.

TABLE 2

| Ink components | Proportion (% by mass) |
|---|---|
| Pigment dispersion | 40.0 |
| Triethylene glycol monobutyl ether | 4.5 |
| 2-pyrrolidone | 5.0 |
| Olfine E1010 | 0.4 |
| 1,2-octanediol | 0.6 |
| Glycerin | 30.0 |
| Ion exchanged water | Residual amount |
| Total | 100.0 |

(Pigment Dispersions)

Table 3 shows dispersions (dispersions d1 to d6) containing six types of resins, respectively, evaluated in Evaluation 1. The dispersions d1 to d6 were prepared using resins A to E, respectively. The resins A to E are alkali-soluble and water-soluble. In Table 3, "Molecular weight" refers to the mass average molecular weight (Mw).

TABLE 3

| | | Pigment dispersion | | | | | |
|---|---|---|---|---|---|---|---|
| | | Dispersion d1 | Dispersion d2 | Dispersion d3 | Dispersion d4 | Dispersion d5 | Dispersion d6 |
| Proportion (% by mass) | Resin | 6.0 | 6.0 | 7.0 | 7.0 | 6.0 | 5.5 |
| | Pigment | 15.0 | 15.0 | 15.0 | 15.0 | 15.0 | 15.0 |
| | Olfine E1010 | 0.5 | 0.5 | 0.5 | 0.5 | 0.5 | 0.5 |
| | Water | Residual amount | Residual amount | Residual amount | Residual amount | Residual amount | Residual amount |
| Resin | | Resin A | Resin B | Resin C | Resin C | Resin D | Resin E |
| Molecular weight | | 20000 | 33000 | 25000 | 25000 | 34000 | 36000 |
| Resin/Pigment (Ratio by mass) | | 0.40 | 0.40 | 0.46 | 0.46 | 0.40 | 0.36 |
| Resin amount (g) | | 6.00 | 6.00 | 7.00 | 7.00 | 6.00 | 6.00 |
| Unadsorbed resin amount (g) | | 0.16 | 0.09 | 0.30 | 0.47 | 0.49 | 0.59 |
| Adsorbed resin proportion (% by mass) | | 97 | 99 | 96 | 93 | 92 | 90 |

Hereinafter, a method of synthesizing the resin A will be described. The resins B to E were synthesized in substantially the same manner as in the synthesis of the resin A except that some conditions were changed to give the mass average molecular weight (Mw) shown in Table 3. Accordingly, the description of the method of synthesizing the resins B to E will be omitted.

A stirrer, a nitrogen inlet tube, a condenser (stirring machine), and a dripping funnel were installed in a 1000-mL four-necked flask. Into the flask, 100 g of isopropyl alcohol and 300 g of methyl ethyl ketone were added, and the mixture was heated to reflux under bubbling with nitrogen gas.

Meanwhile, 40 g of methyl methacrylate, 40 g of styrene, 10 g of butyl acrylate, 10 g of methacrylic acid, and 0.4 g of azobisisobutyronitrile (AIBN) as an initiator were mixed and melted to give a melt. The melt was added dropwise into the flask through the dripping funnel over approximately 2 hours while being heated to reflux at 70° C. Thereafter, the contents of the flask were heated to reflux for another 6 hours.

Subsequently, a methyl ethyl ketone solution containing 0.2 g of AIBN was added dropwise into the flask over 15 minutes. Thereafter, the contents of the flask were heated to reflux for another 5 hours. As a result, a styrene-acrylic resin having a mass average molecular weight (Mw) of 20000 (resin A) was obtained. The acid value of the resin A was determined by titration to be 150 mgKOH/g.

The mass average molecular weight (Mw) of the styrene-acrylic resin thus obtained was determined using a gel filtration chromatography system ("HLC-8020GPC", product of Tosoh Corporation) under the following conditions.

<Conditions for Measurement of Mass Average Molecular Weight>
Column: "TSKgel SuperMultiporeHZ-H", product of Tosoh Corporation (4.6 mm I.D.×15 cm semi-micro column)
Number of columns: 3
Eluent: tetrahydrofuran
Flow rate: 0.35 mL/minute
Sample amount: 10 μL
Measurement temperature: 40° C.
Detector: IR detector Eight TSKgel standard polystyrenes produced by Tosoh Corporation, namely F-40, F-20, F-4, F-1, A-5000, A-2500, A-1000, and n-propylbenzene, were selected to prepare calibration curves.

Next, a method of preparing the dispersions will be described. As shown in Table 3, the resin A was used for the preparation of the dispersion d1.

To a 0.6-L vessel of a media disperser ("DYNO (registered Japanese trademark)-MILL", product of Willy A. Bachofen (WAB) AG), 15% by mass of a black pigment, 6.0% by mass of the resin A, 0.5% by mass of an ethylene oxide adduct of acetylene diol ("Olfine E1010", product of Nissin Chemical Industry Co., Ltd.), and a residual amount of water (ion exchanged water) were added. In addition, potassium hydroxide (KOH) in an amount necessary for neutralization of the resin A was added to the vessel.

"Carbon black MA-100" produced by Mitsubishi Chemical Corporation was used as the black pigment.

The resin A was neutralized with an equivalent amount of 105% aqueous KOH solution. The mass of K was determined based on the mass of the resin A. The mass of the water (ion exchanged water) was determined by taking into account of the mass of water contained in the aqueous KOH solution and the mass of water generated through the neutralization reaction.

Subsequently, a medium (zirconia beads having a diameter of 0.5 mm) in an amount accounting for 70% of the vessel capacity was poured into the vessel, and the contents of the vessel were kneaded under water cooling at 10° C. at a peripheral speed of 8 m/second so that the pigment has a volume median diameter ($D_{50}$) of no less than 70 nm and no greater than 130 nm. As a result, a pigment dispersion was obtained. The volume median diameter ($D_{50}$) was measured using a solution obtained by diluting the pigment dispersion 300-fold with ion exchanged water and using a dynamic light scattering particle size distribution analyzer ("Zetasizer Nano", product of Sysmex Co.)

The use of beads having a smaller diameter facilitates micronization of the pigment. The use of beads having a smaller diameter also strengthens the resin coating over the pigment particles. The dispersity of the coated particles, the amount of free resin, or the particle diameter of the pigment can be varied by varying the diameter of the beads used in the disperser.

The amount of the unadsorbed resin was measured by putting 10 g of the pigment dispersion in a cell (container) of a centrifuge ("NS-C100") and performing centrifugation at a rotational speed of 5000 rpm for 24 hours. Thereafter, the supernatant was collected entirely after it was confirmed by visual observation that the supernatant of the pigment dispersion in the cell was clear. Subsequently, the supernatant collected was solidified at 150° C. under a reduced pressure of 0.67 Pa. Thus, a solid mainly containing the free resin was obtained. The mass of the solid obtained is equivalent to the mass of the unadsorbed resin (including resin in an ionic state and resin bound to counter-ions). "Unadsorbed resin amount" shown in Table 3 refers to the mass of the free resin (unadsorbed resin) relative to 100 g of the pigment dispersion. The adsorbed resin amount per total resin amount (adsorbed resin proportion) was calculated in accordance with the following equation (1).

$$\text{Adsorbed resin proportion} = 100 \times (1 - \text{unadsorbed resin amount/total resin amount})[\% \text{ by mass}] \quad (1)$$

"Resin amount" shown in Table 3 refers to the total resin amount contained in 100 g of the pigment dispersion. "Adsorbed resin proportion" shown in Table 3 is calculated in accordance with the equation (1).

The unadsorbed resin amount can be controlled based on the number of passes for the dispersing by the disperser, the bead diameter, and the ejection rate. Table 4 shows unadsorbed resin amounts of the pigment dispersion obtained under varied dispersing conditions (conditions 1 to 4).

TABLE 4

| Dispersing condition | | Condition 1 | Condition 2 | Condition 3 | Condition 4 |
|---|---|---|---|---|---|
| $1^{st}$ pass | Bead diameter | 1.0 mm | 0.5 mm | 1.0 mm | 1.0 mm |
| | Ejection rate | 300 g/min | 300 g/min | 300 g/min | 300 g/min |
| $2^{nd}$ pass | Bead diameter | — | — | 1.0 mm | 0.5 mm |
| | Ejection rate | — | — | 200 g/min | 300 g/min |
| Resin/Pigment (Ratio by mass) | | 0.3 | 0.3 | 0.3 | 0.3 |
| Unadsorbed resin amount (g) | | 0.18 | 0.09 | 0.54 | 0.03 |

As shown in Table 4, the use of beads having a smaller diameter helped to reduce the unadsorbed resin amount. The unadsorbed resin amount was particularly small when the beads having a smaller diameter were used for the second pass. As obvious from Table 4, the unadsorbed resin amount (eventually, adsorbed resin proportion) can be adjusted by changing the dispersing conditions. The unadsorbed resin amount can be reduced also by replacing the supernatant with ion exchanged water by centrifugation.

Hereinafter, a method of preparing each second ink used in Evaluation 1 will be described.

First, 40.00% by mass of a pigment dispersion, 4.50% by mass of triethylene glycol mono-normal butyl ether, 5.00% by mass of 2-pyrrolidone (solution stabilizer), 0.40% by mass of an ethylene oxide adduct of acetylene diol ("Olfine E1010", product of Nissin Chemical Industry Co., Ltd.) (dispersant), 0.60% by mass of 1,2-octanediol (super penetrating agent), 30.00% by mass of glycerin (moisturizing agent), and a residual amount of ion exchanged water were homogeneously mixed under stirring at a rotation speed of 400 rpm using a stiffing machine ("Three-One Motor BL-600", product of AS ONE Corporation). Subsequently, the liquid mixture was filtered through a filter having a pore size of 5 μm in order to remove foreign substances, coarse particles, and the like. As a result, the second ink was obtained.

<Evaluation Methods>

Hereinafter, methods of evaluating the image density, the water resistance of the image on the paper P, and the offset resistance of the ink employed in Evaluation 1 will be described in order.

(Image Density)

In Evaluation 1, the image density was evaluated using an inkjet recording apparatus (linehead-equipped inkjet recording apparatus, a test machine prepared by KYOCERA Document Solutions Inc., printing speed: 150 sheets/minute) (hereinafter, referred to as printer 100) such as shown in FIG. 2. Hereinafter, the configuration and the operation of the printer 100 will be described with reference mainly to FIG. 2.

As illustrated in FIG. 2, the printer 100 formed an image by ejecting inks onto the paper P based on image data and printing settings (e.g., two-sided or one-sided printing) received from an external computer.

The printer 100 has a paper feed cassette 101. The paper P is loaded in the paper feed cassette 101.

The paper feed cassette 101 has a paper feeding device 102. The paper feeding device 102 includes a roller 102a to be driven by a motor or the like and a roller 102b that is in pressed contact with the roller 102a and follows rotation of the roller 102a. The paper feeding device 102 sends out to a conveyance unit 10 the paper P in the paper feed cassette 101 sheet by sheet.

The conveyance unit 10 includes rollers 10a and 10b, and an endless conveyance belt 10c. The conveyance belt 10c is wound around the separated rollers 10a and 10b in a tensioned manner. The conveyance belt 10c rotates in response to rotation of the rollers 10a and 10b located at opposite ends of the conveyance belt 10c. In Evaluation 1, only the roller 10a, out of the rollers 10a and 10b, located on a downstream side (X2 side) in a paper conveyance direction was driven. In Evaluation 1, a voltage was applied to the roller 10a or the roller 10b to generate an alternating electric field, and thus the conveyance belt 10c held the paper P by electrostatic attraction.

The roller 10a is provided with an encoder 10d. The encoder 10d outputs a pulse train according to a distance of rotational displacement of a rotation axis of the roller 10a.

The roller 10a is driven by a motor, for example. A force of the rotation of the roller 10a is transmitted to the roller 10b via the conveyance belt 10c, and thus the roller 10b rotates (follows). The conveyance belt 10c rotates in response to the rotation of the rollers 10a and 10b. Thus, the paper P held on the conveyance belt 10c was conveyed from an upstream side (X1 side) to the downstream side (X2 side) in the conveyance direction.

An image forming section 200 is provided above the conveyance unit 10 (on a Z1 side). An image was formed (recorded) on one side (recording surface) of the paper P with an ink ejected from the image forming section 200 onto the paper P being conveyed by the conveyance unit 10.

A paper discharging device 103 is disposed in the vicinity of a downstream end (end on the X2 side) of the conveyance unit 10. An exit tray 104 is disposed on a downstream side of the paper discharging device 103. The paper discharging device 103 includes a roller 103a to be driven by a motor or the like and a roller 103b that is in pressed contact with the roller 103a and follows rotation of the roller 103a. The paper P having an image formed thereon was conveyed by the conveyance unit 10 to the paper discharging device 103 and discharged to the exit tray 104 by the paper discharging device 103. The paper P discharged was accumulated on the exit tray 104.

In Evaluation 1, the printing surface (recording surface) of the paper P (recording medium) was to be in contact with the roller 103b (conveyance roller) after the ejection of the ink. In Evaluation 1, the printing surface of the paper P was to be in contact with the roller 103b before penetration of the ink into the paper P or drying of the ink. According to the configuration, the paper P can be conveyed before completion of the penetration of the ink into the paper P or the drying of the ink thereby to increase the printing speed (throughput). However, the above-described configuration allows ink attached to the conveyance roller to be attached (offset) to the surface of paper coming next.

The image forming section 200 includes lineheads 20a to 20d that each eject a black ink. Hereinafter, each of the lineheads 20a to 20d is referred to as linehead 20 where it is not necessary to distinguish among the lineheads 20a to 20d (where common characteristics are described).

Figure 3:
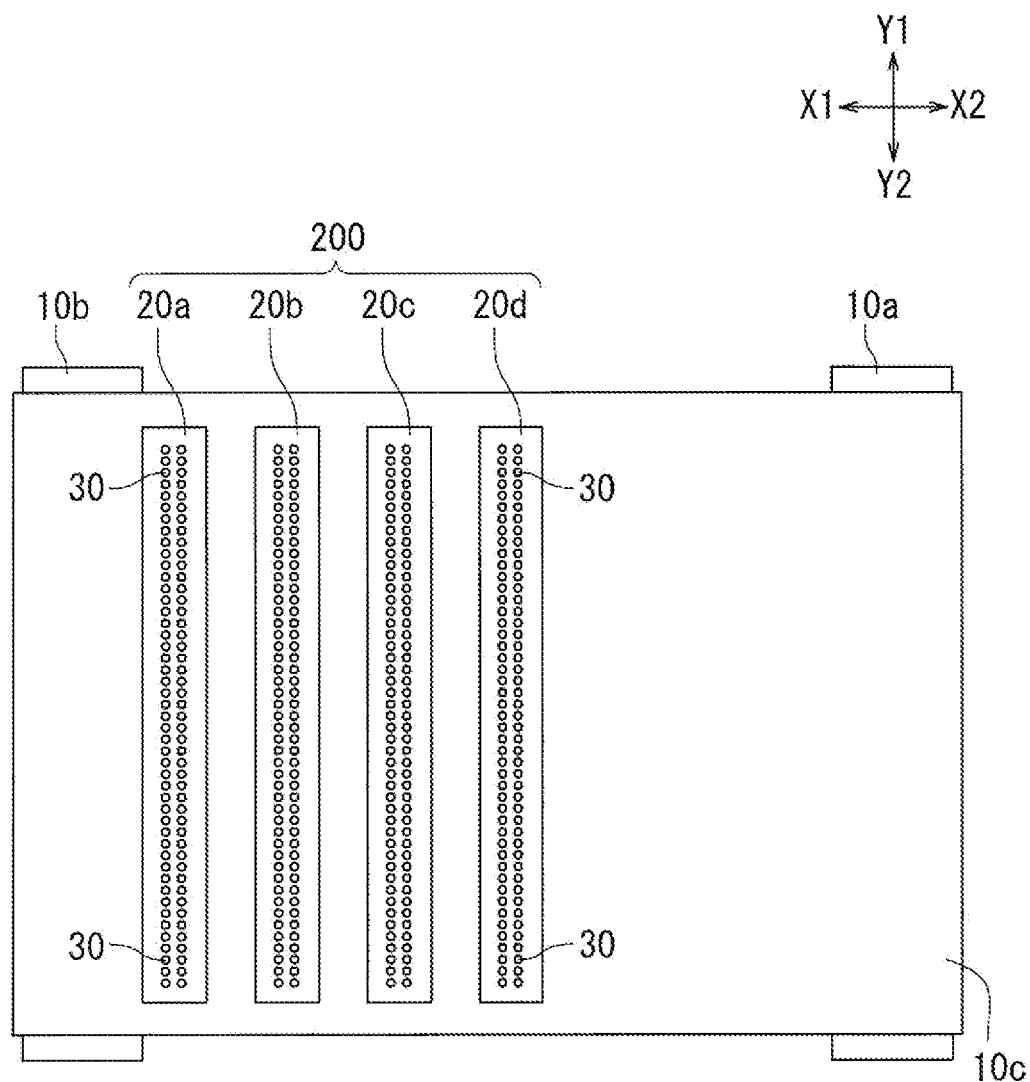
FIG. 3 is a diagram illustrating lineheads included in an image forming section shown in FIG. 2.

Next, the configuration of the image forming section 200 will be described with reference mainly to FIG. 3. FIG. 3 is a diagram illustrating each linehead 20 included in the image forming section 200.

Each linehead 20 is a line inkjet recording head. Each linehead 20 is a long inkjet recording head. Each linehead 20 is elongated in a direction (Y direction) perpendicular to the paper P conveyance direction (X direction).

In Evaluation 1, each linehead 20 has a plurality of ejection units 30. The ejection units 30 are arranged in the Y direction. For example, each linehead 20 (one head) has 166 ejection units 30, and there are 664 ejection units 30 in total (total in the four heads). The pitch between adjacent ejection units 30 in each linehead 20 is 150 dpi, for example. The adjacent lineheads 20 are displaced from one another by ¼ pitch to give a dot density of 600 dpi in total (total in the four heads).

Each linehead 20 ejects an ink through the ejection units 30 according to an image signal. The ink is ejected in a piezoelectric manner in which the ink is forced out by a piezoelectric element.

In Evaluation 1, the linehead 20a is charged with the first ink, and the linehead 20d is charged with the second ink. Both the first and second inks are black inks. The linehead 20b or the linehead 20c may be charged with the second ink instead of the linehead 20d.

In the printer 100 (FIG. 2) used in the present evaluation method, the lineheads 20 eject the inks in sequence to form (record) an image on the paper P (recording medium). The lineheads 20a, 20b, 20c, and 20d are arranged and eject the inks in the noted order from the upstream side (X1 side) to the downstream side (X2 side) in the conveyance direction. Thus, the two black inks (first and second inks) can be ejected in sequence to the same point on the paper P. A monochrome image was formed on the paper P with the two inks (first and second inks) using the printer 100.

Specifically, the head (linehead 20a) closest to the paper feeding device 102 (paper feed roller) was charged with the first ink, and the head (linehead 20d) closest to the paper discharging device 103 (paper discharge roller) was charged with the second ink. Then, a 10 cm×10 cm solid image was formed on A4 plain paper ("C²", product of Fuji Xerox Co., Ltd.) The amount of the inks ejected from the linehead 20a and the linehead 20d was controlled to be 11 pL per droplet, and the same conditions were applied to the inks for image formation.

The plain paper having the image formed thereon was left to stand overnight in a normal-temperature and normal-humidity (25° C., 60% RH) environment. Thereafter, the image density was measured using a portable reflection densitometer ("RD-19I", product of Sakata Inx Eng.) An average of image density values at ten points in the image was used as an evaluation value. A larger evaluation value (average of image density values) indicates a higher density of an image formed.

(Water Resistance)

The plain paper having thereon the image to be used for the evaluation of the image density was left to stand overnight in a normal-temperature and normal-humidity (25° C., 60% RH) environment. Thereafter, an image density (C0) before the paper was immersed in water was measured by the above-described measurement method. The plain paper for which the image density had been measured was immersed in water at room temperature (25° C.) in a container for 5 minutes, and then taken out from the water. The plain paper was dried (25° C., 60% RH, 24 hours), and then an image density (C1) after the plain paper was dried was measured by the above-described measurement method.

Based on the image densities thus obtained, the water resistance of the image on the recording medium (paper P) was calculated in accordance with the following equation (2).

$$\text{Water resistance} = (C0-C1)/C0 \quad (2)$$

A smaller value of the water resistance of an image formed indicates higher water resistance of the image (the dye and the pigment) on the recording medium.

(Offset Resistance)

The head (linehead 20a) closest to the paper feeding device 102 (paper feed roller) was charged with the first ink, and the head (linehead 20d) closest to the paper discharging device 103 (paper discharge roller) was charged with the second ink in the printer 100 (FIG. 2). Excessive ink flowing over nozzle surfaces was wiped with a wiper blade. A4 paper P ("IJW", product of Oji Paper Co., Ltd.) was loaded in the paper feed cassette 101. The distance from the paper P to the nozzle surfaces of the lineheads 20a and 20d was fixed to 1 mm. The rate of conveyance of the paper P from the paper feed cassette 101 to the paper discharging device 103 was set to 846.7 mm/second.

The first ink and the second ink were ejected through the linehead 20a and the linehead 20d, respectively, in an ink ejection amount on the paper P of 15 g/m² in an environment at 10° C. and 80% RH to form a 10 cm×10 cm solid image continuously on 10 sheets of paper P. Contamination was evaluated for a part (offset part) of a non-imaged portion of the 10$^{th}$ sheet of paper P that had contacted with the roller 103b (driven roller) having a surface made from PTFE (polytetrafluoroethylene).

The contamination was evaluated using an image scanner ("GT-X820", product of Seiko Epson Corporation). Specifically, the offset part around the solid image of the 10$^{th}$ sheet of paper P was read by the image scanner, and a pixel count of greater than a threshold, 220 pixels, was determined to be a black spot (contamination). Based on the pixel count of the black spot, an offset area ratio was calculated in accordance with the following equation (3).

$$\text{Offset area ratio} = 100 \times \text{pixel count of black spot/total pixel count}[\%] \quad (3)$$

A larger offset area ratio indicates a higher degree of contamination of the recording paper due to offset.

Ink Sets and Evaluation Results

Table 5 shows the first ink and the second inks included in the ink sets evaluated in Evaluation 1. The ink A4 was prepared as the first ink, and inks B1 to B6 were prepared as the second inks. In Evaluation 1, the ink sets (combinations of the first ink and the respective second inks) shown in Table 5 were evaluated by the above-described methods. The dispersions d1 to d6 shown in Table 3 were used as the pigment dispersions for the inks B1 to B6 as the second inks.

TABLE 5

| | First ink | | | | | |
|---|---|---|---|---|---|---|
| | Ink A4 | Ink A4 | Ink A4 | Ink A4 | Ink A4 | Ink A4 |
| | | | Second ink | | | |
| | Ink B1 | Ink B2 | Ink B3 | Ink B4 | Ink B5 | Ink B6 |
| Pigment dispersion | Dispersion d1 | Dispersion d2 | Dispersion d3 | Dispersion d4 | Dispersion d5 | Dispersion d6 |
| Adsorbed resin proportion (% by mass) | 97 | 99 | 96 | 93 | 92 | 90 |
| Image density | 1.35 | 1.37 | 1.40 | 1.41 | 1.48 | 1.53 |
| Water resistance | 0.14 | 0.12 | 0.13 | 0.16 | 0.15 | 0.17 |
| Offset area ratio (%) | 0.020 | 0.021 | 0.023 | 0.021 | 0.320 | 0.280 |

As shown in Tables 3 and 5, the inks B1 to B4 (second inks) each contained a colorant having an adsorbed resin amount (adsorbed resin proportion) of no less than 93% by mass and less than 100% by mass. As long as the adsorbed resin proportion is no less than 93% by mass, aggregation of the resin A coating the pigment with the polyamine on paper P is expected to be ensured, reducing occurrence of ink offset more effectively (e.g., to an offset area ratio of no greater than 0.030%).

[Evaluation 2]

Hereinafter, Evaluation 2 will be described. The image density, the water resistance of images on the paper P, and the offset resistance of the inks were evaluated for ink sets including second inks containing resins having different mass average molecular weights (Mw). Evaluation 2 was performed in the same manner as in Evaluation 1 except that pigment dispersions each having an adsorbed resin proportion of 97% by mass were used.

Ink Sets and Evaluation Results

Table 6 shows five types of pigment dispersions (the dispersion d1 and dispersions d7 to d10) evaluated in Evaluation 2, and the resin A and resins F to I used for the preparation of the dispersion d1 and dispersions d7 to d10, respectively. The resins A and F to I were anionic and water-soluble. In Table 6, "Molecular weight" refers to the mass average molecular weight (Mw).

TABLE 6

| | | Pigment dispersion | | | | |
|---|---|---|---|---|---|---|
| | | Dispersion d1 | Dispersion d7 | Dispersion d8 | Dispersion d9 | Dispersion d10 |
| Proportion (% by mass) | Resin | 6.0 | 6.0 | 6.0 | 6.0 | 6.0 |
| | Pigment | 15.0 | 15.0 | 15.0 | 15.0 | 15.0 |
| | Olfine E1010 | 0.5 | 0.5 | 0.5 | 0.5 | 0.5 |
| | Water | Residual Amount | Residual amount | Residual amount | Residual amount | Residual amount |
| Resin | | Resin A | Resin F | Resin G | Resin H | Resin I |
| Molecular weight (Mw) of resin | | 20000 | 5000 | 18000 | 30000 | 45000 |
| Resin/Pigment (ratio by mass) | | 0.40 | 0.40 | 0.40 | 0.40 | 0.40 |
| Resin amount (g) | | 6.00 | 6.00 | 7.00 | 7.00 | 6.00 |
| Unadsorbed resin amount (g) | | 0.16 | 0.17 | 0.19 | 0.20 | 0.20 |
| Adsorbed resin proportion (% by mass) | | 97 | 97 | 97 | 97 | 97 |

Table 7 shows the first ink and the second inks included in the ink sets evaluated in Evaluation 2. The ink A4 was prepared as the first ink, and the ink B1 and inks B7 to B10 were prepared as the second inks. In Evaluation 2, the ink sets (combinations of the first ink and the respective second inks) shown in Table 7 were evaluated by the above-described methods. The inks B1 and B7 to B10 as the second inks included the dispersions d1 and d7 to d10 shown in Table 6 as the pigment dispersions, respectively.

TABLE 7

|  | First ink | | | | |
| --- | --- | --- | --- | --- | --- |
|  | Ink A4 | Ink A4 | Ink A4 | Ink A4 | Ink A4 |
|  |  | Second ink | | | |
|  | Ink B1 | Ink B7 | Ink B8 | Ink B9 | Ink B10 |
| Pigment dispersion | Dispersion d1 | Dispersion d7 | Dispersion d8 | Dispersion d9 | Dispersion d10 |
| Adsorbed resin proportion (% by mass) | 97 | 97 | 97 | 97 | 97 |
| Image density | 1.35 | 1.21 | 1.26 | 1.42 | 1.45 |
| Water resistance | 0.14 | 0.16 | 0.15 | 0.18 | 0.14 |
| Offset area ratio (%) | 0.020 | 0.020 | 0.021 | 0.019 | 0.022 |

As shown in Table 6, the ink B1, B9, and B10 (second inks) each contained a styrene-acrylic resin having a mass average molecular weight (Mw) of no less than 20000 and no greater than 45000. As long as the styrene-acrylic resin has a mass average molecular weight (Mw) of no less than 20000, the ink is expected to be prevented from having too high permeability to the paper P, enabling formation of an image having a higher density (e.g., an image density of no less than 1.30). As long as the styrene-acrylic resin has a mass average molecular weight (Mw) of no greater than 45000, the ink is expected to have sufficient permeability to the paper P, reducing occurrence of ink offset more effectively (e.g., to an offset area ratio of no greater than 0.030%).

[Evaluation 3]

Hereinafter, Evaluation 3 will be described. In Evaluation 3, the image density, the water resistance of images on the paper P, and the offset resistance of the inks were evaluated for ink sets including first inks (inks A1 to A7) containing polyamines having different mass average molecular weights (Mw). Evaluation 3 was performed in the same manner as in Evaluation 1 except that the inks A1 to A7 were used as the first inks, and the ink B1 used in Evaluation 1 was used as the second ink in the ink sets evaluated in Evaluation 3.

Ink Sets and Evaluation Results

Table 8 shows the first inks (inks A1 to A7) evaluated in Evaluation 3. Table 8 also shows the mass average molecular weights (Mw) of the polyamines contained in the respective first inks evaluated in Evaluation 3. The mass average molecular weight (Mw) of each polyamine shown in Table 8 was measured in the same manner as in the measurement of the mass average molecular weight (Mw) of the resins (Table 3 and Table 6 in Evaluation 2) used in the pigment dispersions.

As shown in Table 8, the inks A1, A2, A3, A4, A5, A6, and A7 contained the polyamines having a mass average molecular weight (Mw) of 2000, 4000, 5000, 7500, 11000, 15000, and 16000, respectively. The inks A1 to A7 evaluated in Evaluation 3 were prepared in the same manner as in the preparation of the inks included in the ink sets used in Evaluation 1 except that the polyamines having different mass average molecular weights (Mw) were used.

As shown in Table 8, the inks A3 to A6 (first inks) each contained a polyamine having a mass average molecular weight (Mw) of no less than 5000 and no greater than 15000. As long as the polyamine has a mass average molecular weight (Mw) of no less than 5000, the ink is prevented from having too high permeability to the paper P. Accordingly, the resulting image exhibits improved water resistance on the paper P (e.g., a water resistance of no greater than 0.30), and an image having a higher density (e.g., an image density of no less than 1.30) is expected to be obtained. As long as the polyamine has a mass average molecular weight (Mw) of no greater than 15000, sufficient permeability of the ink to the paper P is expected to be ensured, reducing occurrence of ink offset more effectively (e.g., to an offset area ratio of no greater than 0.030%).

[Evaluation 4]

Hereinafter, Evaluation 4 will be described. In Evaluation 4, the image density, the water resistance of the image on the paper P, and the offset resistance of the inks were evaluated for ink sets including first inks (the ink A4 and inks A8 to A13) having different polyamine contents. Evaluation 4 was performed in the same manner as in Evaluation 1 except that the inks A4 and A8 to A13 were used as the first inks, and the ink B1 used in Evaluation 1 was used as the second ink in the ink sets evaluated in Evaluation 4.

Ink Sets and Evaluation Results (First Inks)

Table 9 shows the composition of each of the first inks evaluated in Evaluation 4. The polyamine used in the inks A8 to A13 was the same as the polyamine used in the ink A4.

TABLE 9

| Ink components | Proportion (% by mass) |
| --- | --- |
| Direct Black 19 | 6.00 |
| Triethylene glycol monobutyl ether | 4.50 |
| 2-pyrrolidone | 5.00 |
| Polyamine | 0.03-1.00 |
| Olfine E1010 | 0.40 |
| Glycerin | 30.00 |
| Ion exchanged water | Residual amount |
| Total | 100.00 |

Table 10 shows evaluation results of the first inks (inks A4 and A8 to A13) in Evaluation 4.

TABLE 8

| First ink | Ink A1 | Ink A2 | Ink A3 | Ink A4 | Ink A5 | Ink A6 | Ink A7 |
| --- | --- | --- | --- | --- | --- | --- | --- |
| Molecular weight (Mw) of polyamine | 2000 | 4000 | 5000 | 7500 | 11000 | 15000 | 16000 |
| Second ink | Ink B1 | Ink B1 | Ink B1 | Ink B1 | Ink B1 | Ink B1 | Ink B1 |
| Image density | 1.21 | 1.27 | 1.34 | 1.35 | 1.40 | 1.43 | 1.47 |
| Water resistance | 0.63 | 0.32 | 0.16 | 0.14 | 0.15 | 0.12 | 0.12 |
| Offset area ratio (%) | 0.012 | 0.017 | 0.018 | 0.020 | 0.023 | 0.028 | 0.033 |

TABLE 10

| First ink | Ink A8 | Ink A9 | Ink A10 | Ink A11 | Ink A4 | Ink A12 | Ink A13 |
|---|---|---|---|---|---|---|---|
| Polyamine (% by mass) | — | 0.03 | 0.05 | 0.15 | 0.25 | 0.50 | 0.55 |
| Second ink | Ink B1 | Ink B1 | Ink B1 | Ink B1 | Ink B1 | Ink B1 | Ink B1 |
| Image density | 1.12 | 1.14 | 1.30 | 1.31 | 1.35 | 1.38 | 1.44 |
| Water resistance | 0.35 | 0.23 | 0.18 | 0.16 | 0.14 | 0.13 | 0.12 |
| Offset area ratio (%) | 0.008 | 0.012 | 0.017 | 0.018 | 0.020 | 0.023 | 0.046 |

As shown in Table 10, the inks A9, A10, A11, A4, A12, and A13 had polyamine contents of 0.03% by mass, 0.05% by mass, 0.15% by mass, 0.25% by mass, 0.50% by mass, and 0.55% by mass, respectively. The ink A8 contained no polyamine. The inks A4 and A8 to A13 used in Evaluation 4 were prepared in the same manner as in the preparation of the inks included in the ink sets used in Evaluation 1 except that the polyamine content was varied.

As shown in Table 10, the inks A4 and A9 to A12 (first inks) each had a polyamine content of no less than 0.03% by mass and no greater than 0.50% by mass. As long as the polyamine content is no less than 0.05% by mass, the aggregation of the polyamine with the resin coating the pigment causes precipitation of a sufficient amount of pigment. As a result, an image having a higher density (e.g., an image density of no less than 1.30) is expected to be obtained. As long as the polyamine content is no less than 0.03% by mass, the ink is expected to be prevented from having too low permeability to paper P, improving the water resistance of the image on the paper P more effectively (e.g., to a water resistance of no greater than 0.30). As long as the polyamine content is no greater than 0.50% by mass, the aggregation of the polyamine with the resin coating the pigment causes precipitation of a sufficient amount of pigment. As a result, sufficient permeability of the ink to the paper P is expected to be ensured, reducing occurrence of ink offset more effectively (e.g., to an offset area ratio of no greater than 0.030%).

[Evaluation 5]

Hereinafter, Evaluation 5 will be described. In Evaluation 5, the image density, the water resistance of images on the paper P, and the offset resistance of the inks were evaluated for ink sets including first inks each containing a common direct dye or an acid dye as the dye. Evaluation 5 was performed in the same manner as in Evaluation 1 except that 3.0% by mass of diethylene glycol monoethyl ether was contained in each first ink, and the dye was varied as shown in Table 12.

Ink Sets and Evaluation Results (First Inks)

Table 11 shows the composition of each of the first inks included in the ink sets evaluated in Evaluation 5. The polyamine used in the inks A14 to A16 was the same as the polyamine used in the ink A4.

TABLE 11

| Ink components | Proportion (% by mass) |
|---|---|
| Dye | 6.00 |
| Triethylene glycol monobutyl ether | 4.50 |
| Diethylene glycol monoethyl ether | 3.00 |
| 2-pyrrolidone | 5.00 |
| Polyamine | 0.25 |
| Olfine E1010 | 0.40 |

TABLE 11-continued

| Ink components | Proportion (% by mass) |
|---|---|
| Glycerin | 30.00 |
| Ion exchanged water | Residual amount |
| Total | 100.00 |

Table 12 shows results of the inks A4 and A14 to A16 evaluated in Evaluation 5.

TABLE 12

| First ink | Ink A4 | Ink A14 | Ink A15 | Ink A16 |
|---|---|---|---|---|
| Dye | Direct Black 19 | Direct Black 154 | Direct Black 169 | Acid Black 2 |
| Second ink | Ink B1 | Ink B1 | Ink B1 | Ink B1 |
| Image density | 1.35 | 1.31 | 1.38 | 1.30 |
| Water resistance | 0.14 | 0.12 | 0.17 | 0.40 |
| Offset area ratio (%) | 0.020 | 0.030 | 0.023 | 0.021 |

As shown in Table 12, Direct Black 19 was used as the dye in the ink A4. Direct Black 154 was used as the dye in the ink A14, and Direct Black 169 was used in the ink A15. An acid dye, Acid Black 2, was used as the dye in the ink A16. The first inks used in Evaluation 5 were prepared in the same manner as in the preparation of the inks included in the ink sets used in Evaluation 1 except that the dye was varied, and 3.0% by mass of diethylene glycol monoethyl ether was contained in each first ink.

As shown in Table 12, the ink A4, A14, and A15 each contained a direct dye. The ink A16 contained an acid dye. The use of the direct dyes, which are less water-soluble, is expected to improve the water resistance of images on the paper P more effectively (e.g., to a water resistance of no greater than 0.30).

[Evaluation 6]

Hereinafter, Evaluation 6 will be described. In Evaluation 6, the image density, the water resistance of images on the paper P, and the offset resistance of the inks were evaluated for cases each involving only one ink (only a first ink or a second ink). More specifically, the properties were evaluated for cases involving a first ink containing a polyamine, a first ink containing no polyamine, a second ink containing a polyamine, and a second ink containing no polyamine, respectively. Evaluation 6 was performed in the same manner as in Evaluation 1 except that each of the first inks and the second inks was evaluated independently.

<Inks and Evaluation Results>

Table 13 shows presence or absence of a polyamine in each ink (first ink or second ink) evaluated in Evaluation 6 and results of the respective inks.

TABLE 13

| | Only dye | Dye + Polyamine | Only pigment | Pigment + Polyamine |
|---|---|---|---|---|
| First ink | Dye | Dye | — | — |
| Second ink | — | — | Pigment | Pigment |
| Polyamine | Absent | Present | Absent | Present |
| Image density | 1.13 | 1.17 | 1.15 | — |
| Water resistance | 0.40 | 0.15 | 0.01 | — |
| Offset area ratio (%) | 0.016 | 0.015 | 0.021 | — |

The ink A4 was used as the ink "Dye+Polyamine" shown in Table 13. An ink having the same composition as the ink A4 except for containing no polyamine was used as the ink "Only dye". The ink B1 was used as the ink "Only pigment". An ink having the same composition as the ink B1 except for further containing 0.25% by mass of a polyamine was used as the ink "Pigment+Polyamine". The polyamine used in the ink "Pigment+Polyamine" was the same as the polyamine used in the ink A4.

The first inks and the second inks evaluated in Evaluation 6 were prepared in the same manner as in the preparation of the inks included in the ink sets evaluated in Evaluation 1.

The ink "Pigment+Polyamine" was unevaluable because the pigment and the polyamine aggregated.

Table 13 suggests that the dye had lower water solubility in the ink "Dye+Polyamine" than in the ink "Only dye" because of the addition of the polyamine to the water-soluble dye, increasing the water resistance of the images on the paper P.

So far, the ink set for inkjet recording used in the embodiment and the examples of the present disclosure, and the recording method with the use of the ink set have been described. The present disclosure is not limited to the embodiment and the examples. For example, the following variations may be made to the embodiment to practice the present disclosure.

The configuration of the ink set (components, dimension, materials, shape, or the like) may be freely altered or abbreviated within the scope not departing from the gist of the present disclosure.

A cyan ink, a magenta ink, and a yellow ink may be used with an ink (black ink) of the present embodiment and the examples.

Any inkjet recording head may be employed as well as a linehead. For example, the inkjet recording head may be a serial head. The serial head is an inkjet recording head that ejects an ink while reciprocating (shuttling) in a direction perpendicular to the paper conveyance direction.

The ink set of the present disclosure may be used in an apparatus other than a printer. For example, the ink set of the present disclosure may be used in a multifunction peripheral (multifunctional image forming apparatus). The multifunction peripheral has functions of a scanner, a copier, a printer, and a facsimile machine, for example. The ink set of the present disclosure may be used for a purpose (e.g., data recording) other than image formation.

The above-described embodiment, examples, and variations may be combined in any way. As long as the ink set for inkjet recording includes: a first ink containing at least a black dye and a polyamine; and a second ink containing a black pigment having a coat of an anionic resin, improvement of the image density, reduction of occurrence of ink offset, or formation of a high-quality image with the use of an inkjet recording head (e.g., linehead) can be achieved.

What is claimed is:

1. An ink set for inkjet recording, comprising:
a first ink containing a black dye and a polyamine having a mass average molecular weight of no less than 5000 and no greater than 15000; and
a second ink containing a black pigment having a coat of an anionic resin, wherein
the first ink is an ink that is ejected onto a recording medium,
the second ink is an ink that is ejected onto the first ink ejected on the recording medium,
the first ink and the second ink are not mixed together before the second ink is ejected onto the first ink ejected on the recording medium, and
the first ink and the second ink are mixed together on the recording medium after the second ink is ejected onto the first ink ejected on the recording medium.

2. An ink set according to claim 1, wherein
the black dye is a direct dye, and
the black pigment is carbon black.

3. An ink set according to claim 1, wherein
no less than 93% by mass of the anionic resin is adsorbed to the black pigment, and the anionic resin has a mass average molecular weight of no less than 20000.

4. An ink set according to claim 1, wherein
an amount of the polyamine contained in the first ink is no less than 0.05% by mass and no greater than 0.5% by mass relative to the total mass of the first ink.

5. An inkjet recording method, comprising:
ejecting a first ink containing a black dye and a polyamine having a mass average molecular weight of no less than 5000 and no greater than 15000 onto a recording medium through an inkjet recording head; and
ejecting a second ink containing a black pigment having a coat of an anionic resin onto the first ink ejected on the recording medium through an inkjet recording head.

6. An inkjet recording method according to claim 5, wherein
the black dye is a direct dye, and
the black pigment is carbon black.

7. An inkjet recording method according to claim 5, wherein
no less than 93% by mass of the anionic resin is adsorbed to the black pigment, and the anionic resin has a mass average molecular weight of no less than 20000.

8. An inkjet recording method according to claim 5, wherein
an amount of the polyamine contained in the first ink is no less than 0.05% by mass and no greater than 0.5% by mass relative to the total mass of the first ink.

9. An ink set according to claim 1, wherein
the anionic resin is located on surfaces of particles of the black pigment.

10. An ink set according to claim 1, wherein
the anionic resin is located on surfaces of particles of the black pigment, and
the anionic resin is a styrene-acrylic resin.

11. An inkjet recording method according to claim 5, wherein
the anionic resin is located on surfaces of particles of the black pigment.

12. An inkjet recording method according to claim 5, wherein
the anionic resin is located on surfaces of particles of the black pigment, and
the anionic resin is a styrene-acrylic resin.

13. An ink set according to claim 1, wherein
the first ink further contains triethylene glycol monobutyl ether and 2-pyrrolidone, and
the second ink further contains triethylene glycol monobutyl ether and 2-pyrrolidone.

14. An inkjet recording method according to claim 5, wherein
the first ink further contains triethylene glycol monobutyl ether and 2-pyrrolidone, and
the second ink further contains triethylene glycol monobutyl ether and 2-pyrrolidone.

15. An ink set according to claim 1, wherein
the second ink is an ink that is ejected onto the first ink that has been ejected and landed on the recording medium,
the first ink and the second ink are not mixed together before the second ink is ejected onto the first ink that has been ejected and landed on the recording medium, and
the first ink and the second ink are mixed together on the recording medium after the second ink is ejected onto the first ink that has been ejected and landed on the recording medium.

\* \* \* \* \*